June 6, 1972　　A. F. KOLLMAR　　3,667,730
QUICK ACTION JACK
Filed May 8, 1970
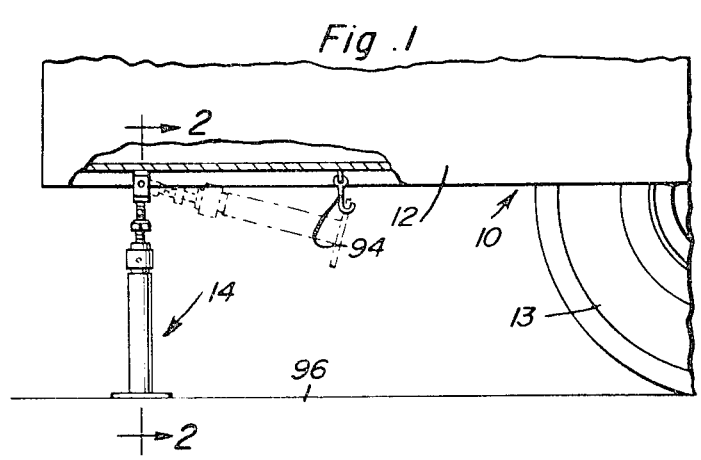
Fig. 1
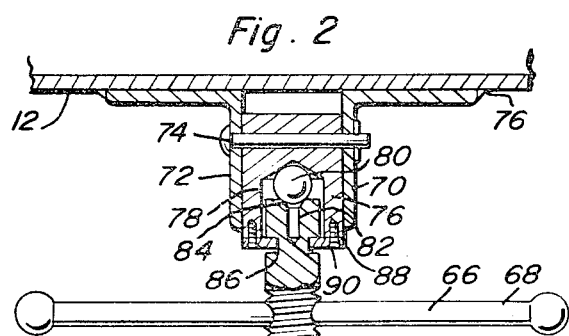
Fig. 2
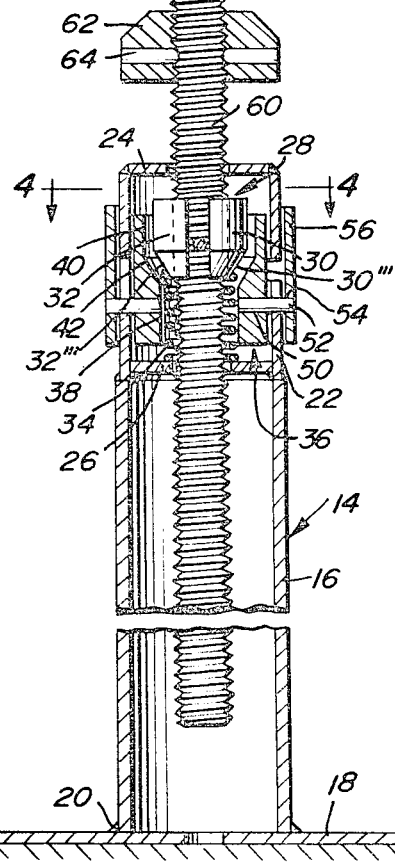
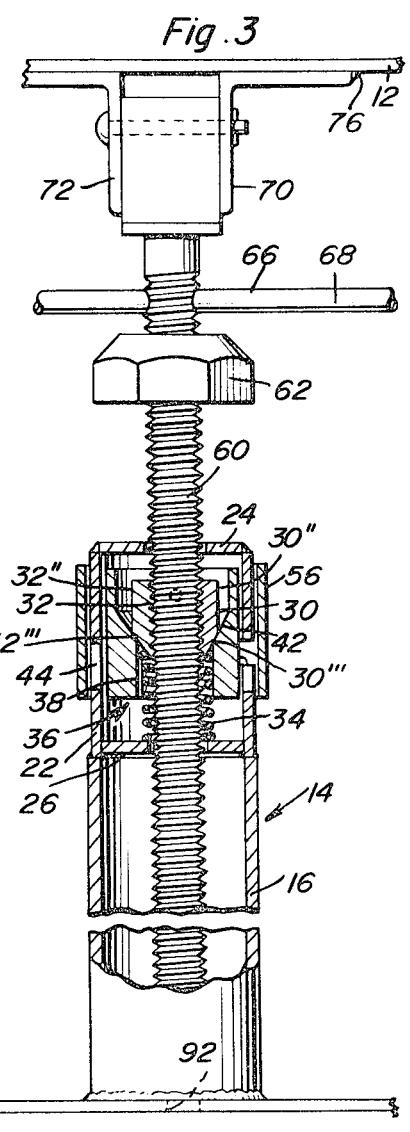
Fig. 3
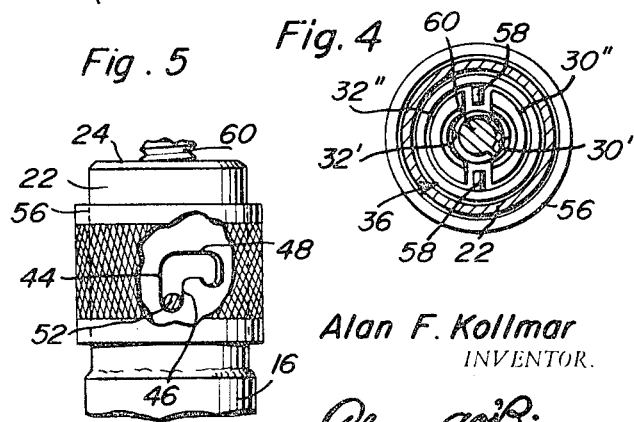
Fig. 5　　Fig. 4
Alan F. Kollmar
INVENTOR.
BY Clarence A. O'Brien
and Harvey B. Jacobson
Attorneys

United States Patent Office 3,667,730
Patented June 6, 1972

---

3,667,730
QUICK ACTION JACK
Alan F. Kollmar, 495 Graymont Drive,
Santa Rosa, Calif. 95405
Filed May 8, 1970, Ser. No. 35,689
Int. Cl. B60s 9/02
U.S. Cl. 254—86 R    10 Claims

ABSTRACT OF THE DISCLOSURE

An upright support jack structure including a lower base portion and an upper screw portion partially telescoped downwardly into the upper end of the base portion. A radially expanded segmental thrust nut is supported within the upper end portion of the base portion against rotation relative thereto and the base portion includes means operative from the exterior of the base portion for radially inwardly shifting the segments of the thrust nut into threaded engagement with the screw portion of the jack. When the segments of the thrust nut are radially inwardly shifted into threaded engagement with the screw portion the thrust nut segments are supported from the base portion against downward movement relative thereto and accordingly, rotation of the upper screw portion relative to the base portion when the thrust nut is threadedly engaged with the screw portion will cause the screw portion to be elevated relative to the base portion.

---

The jack of the instant invention has been designed specifically for use in leveling or stabilizing travel trailers and the like. However, the jack may also be utilized for other uses in different environments. The jack is constructed in a manner whereby it may be quickly extended to almost the full length desired and thereafter actuated to operatively couple the screw portion thereof with the base portion in order that the screw portion need be turned only a few turns in order to level or stabilize an associated load.

The main object of this invention is to provide a quick acting jack specifically designed to stabilize or level travel trailers and the like and which may be quickly actuated to provide the necessary stabilizing function without seemingly endlessly rotating the screw portion of the jack in order to initially extend the jack for positioning relative to the load which is to be stabilized.

Another object of this invention, in accordance with the immediately preceding object, is to provide a quick acting jack which may be readily stored in an out-of-the way position.

A still further object of this invention is to provide a quick acting jack which may be readily shifted from its stored position and actuated to an operative position with little effort on the part of the operator of the jack.

A final object of this invention to be specifically enumerated herein is to provide a jack in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational view of a travel trailer with the jack of the instant invention illustrated in operative position to stabilize or level the body of the travel trailer and an alternate stored position of the jack illustrated in phantom lines;

FIG. 2 is an enlarged fragmentary vertical sectional view taken substantially upon the plane indicated by the section line 2—2 of FIG. 1;

FIG. 3 is a vertical sectional view similar to FIG. 2 but illustrating the split thrust nut portion of the jack in a contracted position threadedly engaged with the threaded screw member of the jack;

FIG. 4 is a horizontal sectional view taken substantially upon the plane indicated by the section line 4—4 of FIG. 2; and FIG. 5 is a fragmentary elevational view of the area of the jack upon which the actuating sleeve portion is mounted and with portions of the actuating sleeve portion broken away to more clearly illustrate the pin and slot connection by which the actuating sleeve portion is retained in an operative position.

Referring now more specifically to the drawings the numeral 10 generally designates a conventional form of travel trailer including a body 12 and ground engaging wheels 13. The quick action jack of the instant invention is referred to in general by the reference numeral 14 and is illustrated in solid lines in FIG. 1 as having its upper end portion supported from the body 12 of the trailer 10.

With attention invited now more specifically to FIGS. 2 and 3 of the drawings it may be seen that the jack 14 includes a lower upright tubular base portion 16 having a horizontal pressure foot 18 secured to its lower end by welding 20. The upper end of the lower base portion 16 includes a diametrically reduced section 22 partially closed at its upper end by means of an annular top wall 24 secured thereover. In addition, the lower end of the section 22 includes an annular partition 26 secured therein in any convenient manner.

A segmental thrust nut referred to in general by the reference numeral 28 is provided and includes a pair of half segments 30 and 32 including threaded semi-cylindrical inner surfaces 30' and 32', respectively. In addition, the segments 30 and 32 include outer cylindrical surfaces 30" and 32" as well as lower partial conical surfaces 30'" and 32'".

A compression spring 34 is disposed within the base portion 16 above the partition 26 and has its lower end abutted against the partition 26 for support of the spring 34 against downward movement in the base or body portion 16. The upper end of the spring 34 embracingly engages the lower ends of the sections 30 and 32 in the manner illustrated in FIG. 2 of the drawings.

An actuating sleeve referred to in general by the reference numeral 36 is loosely received within the section 22 and includes a bore 38 formed therethrough through which the spring 34 is received. In addition, the sleeve 36 includes an upper end counterbore 40 which loosely embraces the sections 30 and 32 as well as truncated conical surfaces 42 for engagement with the partial conical surfaces 30'" and 32'" in a manner to be more fully hereinafter set forth.

The section 32 includes inverted L-shaped diametrically oriented slots 44 including vertical leg portions 46 and horizontal leg portions 48. The sleeve 36 includes a pair of diametrically opposite and aligned radial bores 50 and the inner ends of a pair of support and guide pins 52 are secured within the bores 50 and project outwardly from the sleeve 36. The outer ends of the guide pins 52 are received through the slots 44 and the outer terminal ends of the guide pins 52 are secured in diametrically aligned radial bores 54 formed in an outer sleeve 56 loosely telescoped over the section 22. Accordingly, it may be seen that the sleeve 36 may be positioned in a lower position when the guide pins 52 are disposed in the lower ends of the vertical legs 46 of the slots 44 and that the sleeve 36 may be positioned in an upper position with the outer ends of the guide pins 52 positioned in the ends of the horizontal legs 48 of the slots 44 remote from the vertical legs 46.

The sleeve 36 further includes a pair of diametrically aligned inwardly projecting radial pins 58 whose inner ends are received between the pairs of adjacent ends of the sections or segments 30 and 32 and accordingly, the sections 30 and 32 are prevented from rotating relative to the sleeve 36.

The jack 14 additionally includes an elongated screw member 60 which is externally threaded throughout all but its uppermost end portion and the screw member 60 is received downwardly through the annular top wall 42, between the sections or segments 30 and 32, through the compression spring 34 and through the partition 26. An adjusting nut 62 is mounted on the screw member 60 and releasably retained in position thereon by means of a diametric pin 64 extending through the nut 62 and a diametric bore (not shown) formed in the screw member 60. Further, the screw member 60 includes a diametric handle 66 including radially outwardly propecting and diametrically opposite handle portions 68 and the upper end of the screw member 60 is pivotally secured between a pair of angle brackets 70 and 72 by means of a pivot fastener 74. The angle brackets 70 and 72 are secured to the underside of the body 12 in any convenient manner such as by welding 76 and the pivot 74 passes through a pivot block 76 received between the angle members 70 and 72 and secured to the upper end of the screw member 60.

The pivot block or member 76 includes a downwardly opening blind bore 78 in which a ball bearing member 80 is upwardly seated and the upper end of the screw member 60 includes a blind diametric bore 82 which is counterbored as at 84 and the counterbored portion 84 of the blind bore 82 bears upwardly on the ball bearing member 80 when the jack 14 is supporting a load. Finally, the upper end of the screw member 60 is provided with a circumferential groove 86 immediately below the lower end of the pivot block 76 and a pair of half annular retaining plates 88 are secured to the lower end of the pivot block 76 by means of fasteners 90 and have their inner peripheral portions received in the circumferential groove 86 whereby the upper end of the screw member 60 is prevented from axial withdrawal from the blind bore 78.

The pressure foot 18 includes a bore 92, see FIG. 3, through which a hook 94 pivotally supported from the body 12 may be engaged in order to retain the jack 14 in a retracted inoperative and stored position such as that illustrated in phantom lines in FIG. 1 of the drawings.

When it is desired to level or stabilize the body 12, a plurality of jacks 14 spaced about the periphery of the body 12 may be actuated in the following manner.

Each jack 14 is released from its supporting hook 94 and swung downwardly to a vertical position. During this operation, inasmuch as the base portion 16 will be urged downwardly by gravity, the base portion 16 will slide downwardly relative to the screw member 60 until the pressure foot 18 abuts against the ground 96. This is accomplished by the threads 30' and 32' on the segments 30 and 32 coacting with the threads on the screw member 60 to cam the segments 30 and 32 radially outwardly from opposite sides of the screw member when the sleeve 36 is disposed in its lowermost position. Accordingly, the base portion 16 of the jack may be lowered into contact with the ground 96 independent of any actuation of the jack 14 as long as the sleeve 36 is in the lowered inoperative position. Thereafter, when it is desired to apply force upwardly on the body 12, the outer sleeve 56 is raised and then rotated slightly in a counterclockwise direction as viewed from above so as to swing the outer ends of the pins 52 into the closed ends of the horizontal legs 48 of the slots 44. The raising of the outer sleeve 56 will of course cause the inner sleeve or actuating sleeve 36 to be elevated and the concial surfaces 42 of the inner sleeve 36 to engage the conical surfaces 30''' and 32''' of the segments 30 and 32. This will in turn cause the segments 30 and 32 to be cammed radially inwardly toward opposite sides of the screw member 60 so that the threads 30' and 32' of the segments 30 and 32 are properly threadedly engaged with the threads of the screw member 60. Thereafter, it is merely necessary to turn the screw member 60 either by the handle 66 or by a wrench engaged with the nut 62 in order to extend the screw member 60 relative to the base portion 16. If it is desired, the pin 64 may be removed after the jack has been properly adjusted and the nut 62 may be screwed downwardly on the screw member 60 into engagement with the top wall 24 so as to function somewhat in the manner of a jamnut to reduce the possibility of any vibrations causing rotation between the screw member 60 and the base portion 16. However, the primary function of the nut 62 is to allow a ratchet wrench or the like to be engaged therewith when the pin 64 is utilized to secure the nut 62 in stationary position relative to the screw member 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. An upright support jack structure including a lower tubular base portion and an upper screw portion partially downwardly telescoped into the upper end of the base portion, a radially expanded segmental thrust nut including a plurality of nut segments supported and enclosed entirely within the upper end portion of the base portion about said upper screw portion and against rotation relative to said base portion, and actuating means carried by the base portion operative from the exterior thereof for radially inwardly shifting the segments of said thrust nut into threaded engagement with a substantial majority of one full circumferential zone of said screw portion and releasably positively retaining said segments in threaded engagement therewith.

2. An upright support jack structure including a lower base portion and an upper screw portion partially downwardly telescoped into the upper end of the base portion, a radially expanded segmental thrust nut supported within the upper end portion of the base portion against rotation relative thereto, and actuating means carried by the base portion operative from the exterior thereof for radially inwardly shifting the segments of said thrust nut into threaded engagement with said screw portion, said base portion including abutment means disposed about said screw portion below the segments of said thrust nut and for support of said segments in expanded position from beneath, said segments including downwardly and outwardly facing cam surfaces, said actuating means comprising an annular member shiftable along said base portion between lower and upper positions and including upwardly and inwardly facing cam surfaces operative, in conjunction with said segment cam surfaces, to upwardly and inwardly displace said segments into threaded engagement with said screw in response to movement of said annular member from its lower position to its upper position, said actuating means and said base portion including coacting means for releasably securing said actuating means in said upper position.

3. The combination of claim 2 wherein said abutment means includes a compression spring in said base portion encircling said screw and supported at its lower end from said base portion.

4. The combination of claim 2 wherein said actuating means comprises an inner sleeve disposed within said lower portion about said screw member and shiftable longitudinally relative to said screw and base portion between upper and lower positions, said lower portion including means defining longitudinal slots, said inner sleeve including outwardly projecting portions projecting outwardly through and slidable in said slots.

5. The combination of claim 4 including an outer sleeve slidable along said lower portion and to which the outer ends of said outwardly projecting portions are attached.

6. The combination of claim 5 wherein said outer sleeve is rotatable relative to said lower portion and said slots include upper horizontal portions into which said outwardly projecting portions are swingable, said upper horizontal slot portions and said outwardly projecting portions comprising said coacting means for releasably securing said actuating means in said upper position.

7. An upright support jack structure including a lower base portion and an upper screw portion partially downwardly telescoped into the upper end of the base portion, a radially expanded segmental thrust nut supported within the upper end portion of the base portion against rotation relative thereto, and actuating means carried by the base portion operative from the exterior thereof for radially inwardly shifting the segments of said thrust nut into threaded engagement with said screw portion, said segmental thrust nut, when radially contracted into threaded engagement with said screw member, defining spaces between the adjacent ends of adjacent segments thereof, said lower base portion including portions thereof extending generally radially of the center axis of said screw member received in the spaces between the adjacent ends of adjacent thrust nut segments.

8. The combination of claim 1 including a lift pad rotatably mounted on the upper end of said screw member.

9. The combination of claim 1 including a stop and jamnut threaded on said screw member above said lower base portion and abuttingly engageable with the upper end thereof.

10. An upright support jack structure including a lower base portion and an upper screw portion partially downwardly telescoped into the upper end of said base portion, a radially expanded segmental thrust nut supported within the upper end portion of the base portion against rotation relative thereto, actuating means carried by said base portion and operable to radially inwardly shift the segments of said thrust nut into threaded engagement with said screw portion, said segmental thrust nut, when radially contracted into threaded engagement with said screw member, defining spaces between the adjacent ends of adjacent segments thereof, said lower base portion including portions thereof extending generally radially of the center axis of said screw member and received in the spaces between the adjacent ends of adjacent thrust nut segments.

References Cited

UNITED STATES PATENTS

| | | | |
|---|---|---|---|
| 1,612,124 | 12/1926 | Huelsick | 254—100 |
| 2,487,827 | 11/1949 | Persson | 254—98 |
| 2,001,057 | 5/1935 | Fellay | 74—424.8 A |
| 2,294,745 | 9/1942 | Goetz | 74—424.8 A |
| 3,022,043 | 2/1962 | Weiss | 254—98 |

OTHELL M. SIMPSON, Primary Examiner

U.S. Cl. X.R.

74—424.8 A; 254—98